(12) United States Patent
Oklelas, Jr.

(10) Patent No.: US 6,468,431 B1
(45) Date of Patent: Oct. 22, 2002

(54) METHOD AND APPARATUS FOR BOOSTING INTERSTAGE PRESSURE IN A REVERSE OSMOSIS SYSTEM

(76) Inventor: Eli Oklelas, Jr., 444 Avenue De Lafayette, Monroe, MI (US) 48162

( * ) Notice: Subject to any disclaimer, the term of this patent is extended or adjusted under 35 U.S.C. 154(b) by 65 days.

(21) Appl. No.: 09/702,504

(22) Filed: Oct. 31, 2000

Related U.S. Application Data

(60) Provisional application No. 60/163,042, filed on Nov. 2, 1999.

(51) Int. Cl.[7] .............................................. B01D 61/00
(52) U.S. Cl. ................. 210/652; 210/195.2; 210/257.2; 210/416.1
(58) Field of Search ................. 210/652, 651, 210/195.2, 257.2, 416.1

(56) References Cited

U.S. PATENT DOCUMENTS

| | | | |
|---|---|---|---|
| 4,187,173 A | | 2/1980 | Keefer |
| 4,230,564 A | | 10/1980 | Keefer |
| 4,243,523 A | * | 1/1981 | Pelmulder |
| 4,255,081 A | | 3/1981 | Oklejas et al. |
| 4,432,876 A | | 2/1984 | Keefer |
| 4,830,572 A | | 5/1989 | Oklejas et al. |
| 4,966,708 A | | 10/1990 | Oklejas et al. |
| 4,973,408 A | | 11/1990 | Keefer |
| 4,983,305 A | | 1/1991 | Oklejas et al. |
| 5,049,045 A | | 9/1991 | Oklejas et al. |
| 5,082,428 A | | 1/1992 | Oklejas et al. |
| 5,106,262 A | | 4/1992 | Oklejas et al. |
| 5,320,755 A | * | 6/1994 | Hagqvist et al. |
| 5,819,524 A | | 10/1998 | Bosley et al. |
| 5,951,169 A | | 9/1999 | Oklejas et al. |
| 5,980,114 A | | 11/1999 | Oklejas, Jr. |
| 6,017,200 A | * | 1/2000 | Childs et al. |
| 6,036,435 A | | 3/2000 | Oklejas |
| 6,139,740 A | * | 10/2000 | Oklijas |
| 6,187,200 B1 | * | 2/2001 | Yamamura et al. |
| 6,345,961 B1 | * | 2/2002 | Oklijas, Jr. |

\* cited by examiner

*Primary Examiner*—Ana Fortuna
(74) *Attorney, Agent, or Firm*—Kevin G. Mierzwa

(57) ABSTRACT

An apparatus and method suitable for use in a reverse osmosis desalinization system having a first process chamber has a first reverse osmosis membrane therein, a first feed inlet, a first permeate outlet, and a first concentrate outlet. A second process chamber having a second reverse osmosis membrane has a second feed inlet, a second permeate outlet, and a second concentrate outlet.

16 Claims, 2 Drawing Sheets

METHOD AND APPARATUS FOR BOOSTING INTERSTAGE PRESSURE IN A REVERSE OSMOSIS SYSTEM

Related Applications

The present application relates to U.S. patent application Ser. No. 09/491,769 entitled "Hydraulic Energy Recovery Device" filed Jan. 26, 2000, and U.S. Provisional Application No. 60/163,042, filled Nov. 2, 1999 entitled "Method and Apparatus for Membrane Recirculation and Concentrate Energy Recovery a Reverse Osmosis System" filed simultaneous herewith, each of which are hereby incorporated by reference.

TECHNICAL FIELD

The present invention relates generally to a reverse osmosis systems for desalinization of water, and more specifically, to an interstage pressure boosting system of a multiple stage reverse osmosis system.

BACKGROUND OF THE INVENTION

Reverse osmosis (RO) is a process widely used for desalinization of water. Reverse osmosis membranes are contained in a process chamber into which pressurized feedwater is admitted. A portion of the pressurized water permeates across the membrane and exits the process chamber as purified water at a low pressure and is referred to as permeate. The remainder of the water, still at high pressure, exits the process chamber and is referred to as a concentrate.

During the life of a membrane the fluid pressure must be adjusted slightly to ensure optimum operation. Without such optimization, the system will needlessly use energy or not produce the desired amount of permeate.

The concentrate from reverse osmosis systems may be used in three ways. The first way is to dispose of the concentrate by throttling the pressure with an orifice plate. The second way in which the high pressure concentrate may be used is to drive an energy recovery turbine (ERT). The output of the turbine is used to drive the feedwater into the system. The use of a turbine reduces the net energy consumption of the system. A third way in which to use the high pressure concentrate is to increase the pressure of the high level concentrate and admit the concentrate to a second reverse osmosis chamber to extract additional permeate. The high pressure concentrate from the second reverse osmosis chamber may then be handled in the above-mentioned three manners.

Referring now to FIG. 1, a known reverse osmosis system 10 is illustrated having a feed pump 12 which is driven by a motor 14 to pressurize feed fluid from a feed input 16. Pressurized fluid leaves pump 12 through an output 18 and enters a first reverse osmosis process chamber 20. The process chamber 20 has a permeate header 22 through which permeate is removed from the reverse osmosis chamber 20. Reverse osmosis chamber 20 also has a concentrate output 24 which removes concentrate from the reverse osmosis chamber 20 at a high pressure. The concentrate output 24 is coupled to a booster pump 26 which is driven by a booster pump motor 28. The booster pump 26 with booster pump motor 28 boosts the pressure of the concentrate before it is admitted into a second reverse osmosis chamber 30. The reverse osmosis chamber 30 has a permeate output 32 coupled to permeate header 22. A concentrate output 34 is coupled to an energy recovery turbine 36 which is coupled to a shaft 38 common to both motor 14 and pump 12. In this manner, some of the load of pump 12 is relieved by energy recovery turbine 36.

Another known arrangement similar to FIG. 1 is illustrated having the same components illustrated with the same reference numerals. In this embodiment, second energy recovery turbine 40 is coupled to concentrate output 34 is used to drive booster pump 26 on a common shaft 42. The energy recovery turbine 36 is thus used to recover any remaining energy in the concentrate.

One problem in known systems is that energy-wasting throttle valves and bypass lines are typically used to control the flow and the pressure of fluids to and from the reverse osmosis chambers. It would therefore be desirable to provide a reverse osmosis system that allows independent control of the flow and pressure of each reverse osmosis chamber without the use of energy wasting throttle valves and bypass lines.

SUMMARY OF THE INVENTION

It is therefore one object of the invention to provide a reverse osmosis system that may easily and energy-efficiently be adjusted to operate at its design capacity despite changes in the membrane characteristics due to fouling or other operating parameters.

In one aspect of the invention, a common shaft is used to rotatably hold a first pump fluidically coupled to the first feed inlet, a pump motor, a first energy recovery turbine fluidically coupled to the first concentrate outlet, and a second energy recovery turbine fluidically coupled to the second concentrate outlet. A second pump may also be coupled to the first concentrate outlet to increase the pressure of the first concentrate prior to entering the second process chamber.

In a further aspect of the invention, the second pump may be rotatably coupled to a booster pump motor. In another aspect of the invention, the second pump may be coupled to a third energy recovery device that is fluidically coupled to the second concentrate outlet.

In a further aspect of the invention, a method for operating a reverse osmosis system comprises the steps of:

providing energy from a first reverse osmosis process chamber to boost the pressure of feed fluid to the first reverse osmosis process chamber;

providing energy from a second process chamber to boost the pressure of feed fluid to a first process chamber; and, collecting permeate form the first process chamber and the second reverse osmosis process chamber.

One advantage of the present invention is that energy-wasting throttle valves and bypass lines have been eliminated from the reverse osmosis process. Another advantage of the invention is that more energy is recovered from the process lowering the overall cost of operating such a process.

Other objects and features of the present invention will become apparent when viewed in light of the detailed description of the preferred embodiment when taken in conjunction with the attached drawings and appended claims.

DETAILED DESCRIPTION OF THE PREFERRED EMBODIMENT

In the following figures, the same references numerals will be used to identify identical components in the various views.

The present invention is described with respect to various preferred embodiments and preferred system uses. One skilled in the art would recognize various alternatives without varying from the spirit of the invention such as nondesalinization reverse osmosis systems.

Figure 1:
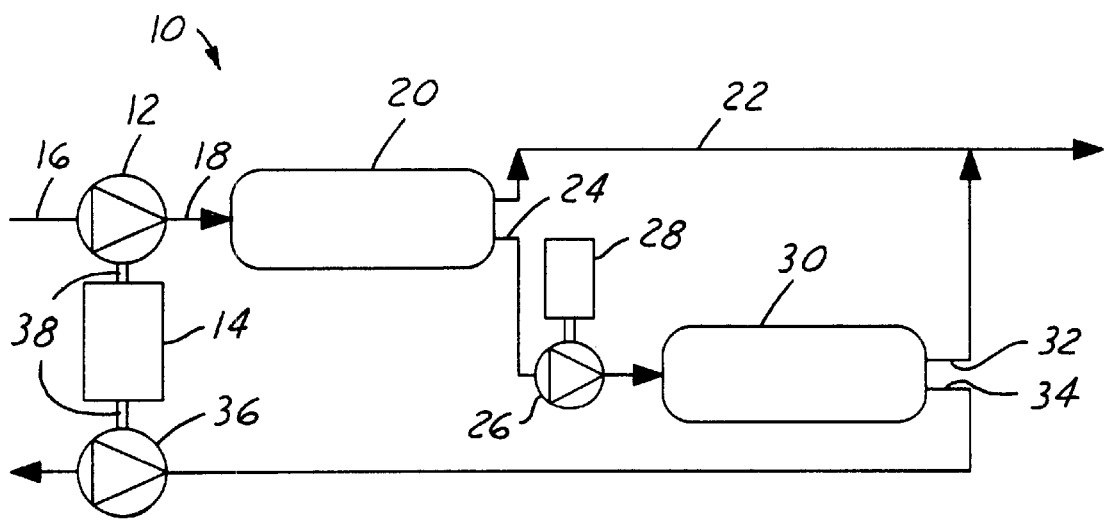
FIG. 1 is a schematic view of a first known reverse osmosis system.
Figure 3:
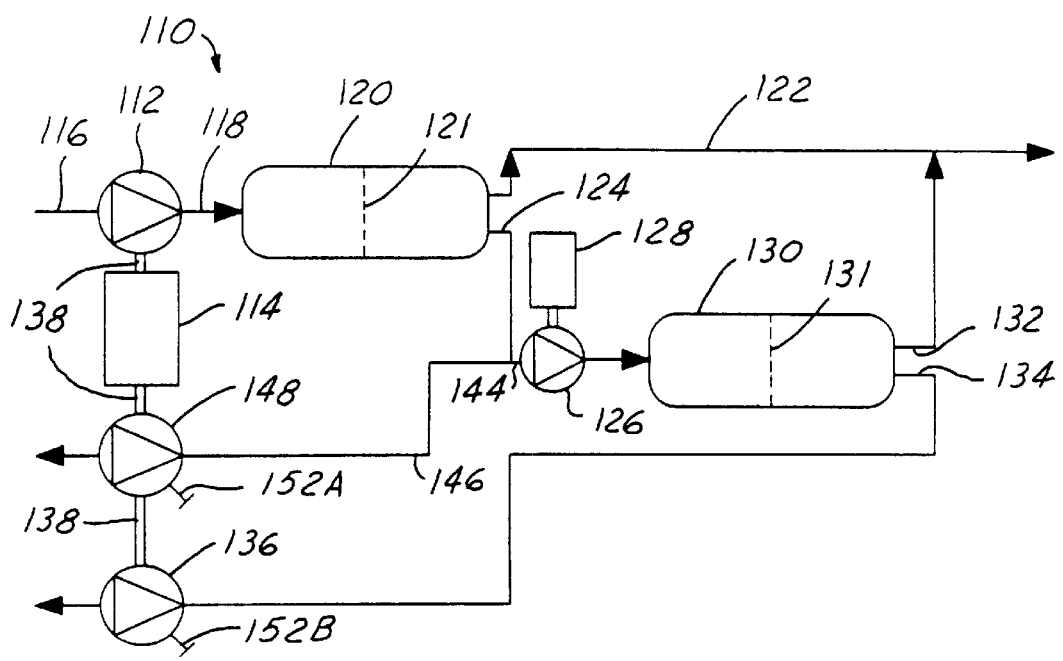
FIG. 3 is a schematic view of a first embodiment of a reverse osmosis system according to the present invention.

Referring now to FIG. 3, an improved embodiment similar to that shown in FIG. 1 is illustrated with the same components having the same reference numerals from FIG. 1 increased by 100.

Referring now to FIG. 1, a known reverse osmosis system 110 is illustrated having a feed pump 112 which is driven by a motor 114 to pressurize feed fluid from a feed input 116. Pressurized feed fluid leaves pump 112 through an output 118 and enters a first reverse osmosis process chamber 120. The first osmosis chamber 130 has a membrane 121 therein for filtering feed fluid. The process chamber 120 has a permeate header 122 through which low pressure that has passed through the membrane 121 is removed from the reverse osmosis chamber 120.

Reverse osmosis chamber 120 also has a concentrate output 124 which removes concentrate from the reverse osmosis chamber 120 at a high pressure. The concentrate output 124 is coupled to a booster pump 126 which is driven by a booster pump motor 128. The booster pump 126 with booster pump motor 128 boosts the pressure of the concentrate before it is admitted into a second reverse osmosis chamber 130 that has a membrane 131 therein for filtering fluid there through. The reverse osmosis chamber 130 has a permeate output 132 coupled to permeate header 122. A concentrate output 134 is coupled to an energy recovery turbine 36 which is coupled to a shaft 38 common to both motor 114 and pump 112. In this manner, some of the load of pump 112 is relieved by energy recovery turbine 136.

In this embodiment, concentrate outlet 124 has a first portion 144 directed to booster pump 126 and a second portion 146 directed to an energy recovery turbine 148. Pressure booster pump motor 128 is operated to boost the pressure into second reverse osmosis chamber 130.

Both energy recovery turbine 136 and 148 along with motor 114 which drives pump 112 are coupled to a common shaft 138 for recovering energy from both the first process chamber through first portion of concentrate outlet 146 and recovering energy from the second concentrate output 134.

As illustrated, each energy recovery turbine preferably comprises a nozzle valve 152A or 152B to adjust the flow and pressure without losing energy recovery efficiency. Throttling processes have also been eliminated which increases the efficiency of the reverse osmosis system. Advantageously, the present invention accomplishes this goal while maintaining independent control of the first and second reverse osmosis chambers.

As those skilled in the art will recognize, feed pump 112 is assumed to be a constant flow rate positive displacement pump. However, if a centrifugal feed pump is used, additional means such as a variable feed pump, a speed or feed throttling valve may be needed as would be recognized by those skilled in the art. A turbocharger driven by concentrate streams from either the first or second chamber may be used.

Figure 2:
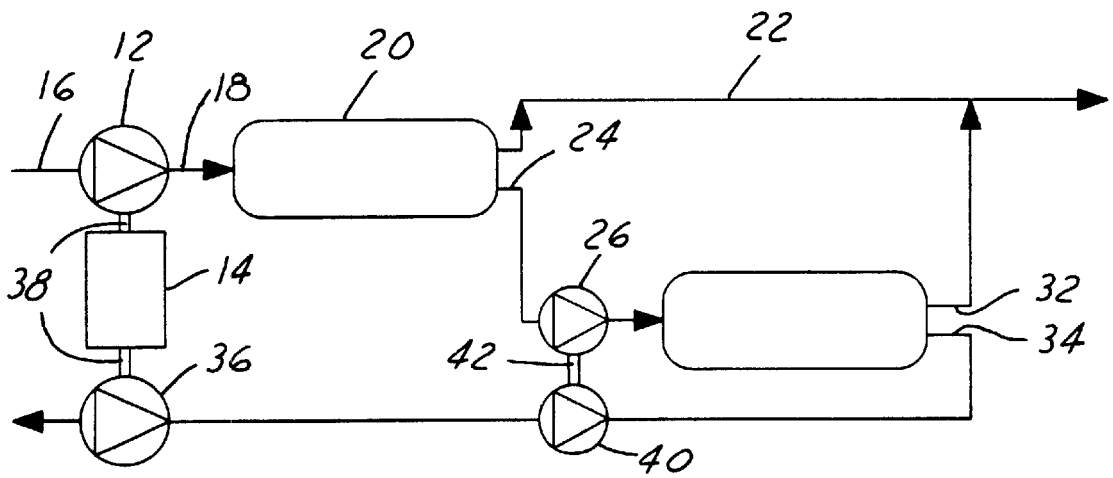
FIG. 2 is a schematic view of a second known reverse osmosis system.
Figure 4:
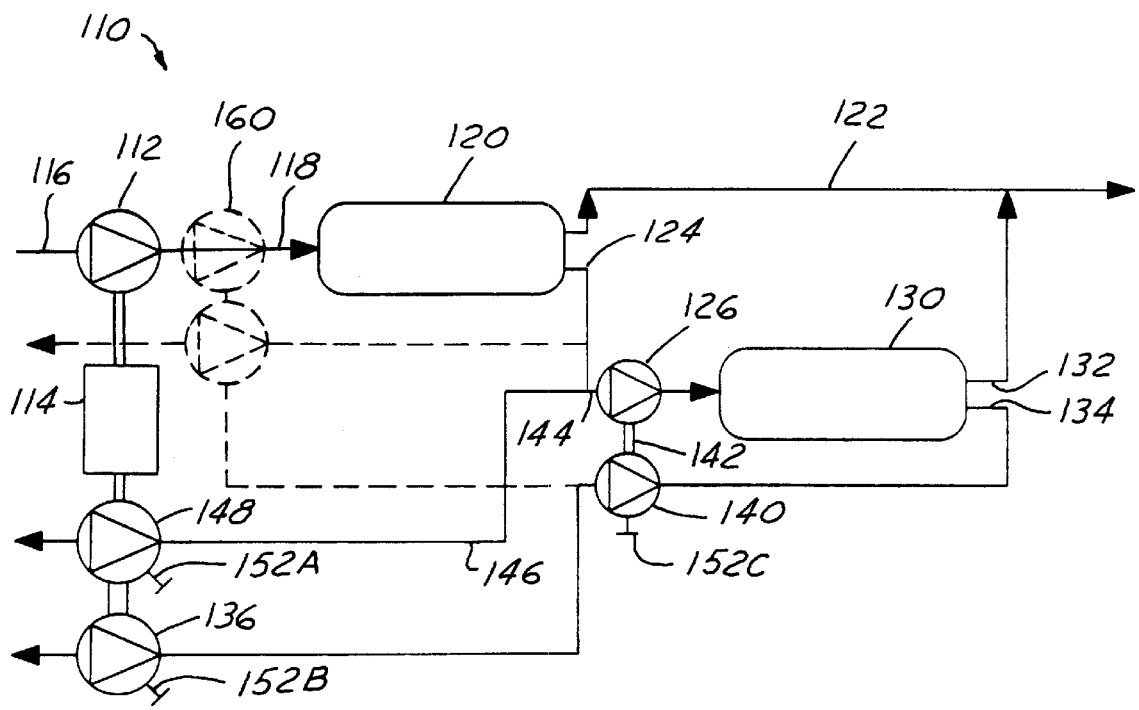
FIG. 4 is a schematic view of a second embodiment of a reverse osmosis system according to the present invention.

Referring now to FIG. 4, a similar embodiment to that shown in FIG. 2 above is illustrated. In this embodiment, booster pump motor 128 has been replaced with an energy recovery turbine 140. Energy recovery turbine 140 also has a nozzle valve 152C to control the flow and the pressure there through. Energy recovery turbine 140 is coupled to a common shaft 142 of booster pump 126.

In both embodiments in the invention, the fluid in feed input 116 is increased in pressure by pump 112 which is driven by motor 114, and energy recovery turbines 148 and 136. The pressurized output feed fluid from pump 112 enters the reverse osmosis chamber 20. Permeate under low pressure exits through permeate header 122. High pressure concentrate exits reverse osmosis chamber 120 and a portion is directed to booster pump 126 in a conventional manner. A second portion of the concentrate is directed to the energy recovery turbine 148. Additionally with respect to FIG. 4, second energy recovery turbine 140 may be used to recover energy from the high pressure concentrate output of the second reverse osmosis chamber 130 to boost the inlet pressure at the second process chamber.

With respect to FIG. 3, four operating scenarios are possible. In the first scenario, if it is desired to raise the pressure of the first reverse osmosis chamber and keep the pressure in the second reverse osmosis chamber 130 constant, the nozzle valve 152A is closed and the speed of booster pump motor 128 is increased. When the pressure of the first reverse osmosis chamber 130 is desired to be reduced, while the second reverse osmosis chamber 130 is desired to remain constant, valve 152A is opened and the speed of the booster pump 126 is increased.

When the pressure of the first reverse osmosis chamber 120 is desired to remain constant while the second reverse osmosis chamber pressure is to be increased, the speed of booster pump 126 is increased while valve 152B is closed. When first reverse osmosis chamber 120 is desired to remain constant while the second reverse osmosis chamber 130 is desired to be lowered, the booster pump speed 126 is reduced while the nozzle valve 152B is opened.

Referring now to FIG. 4, the same four operating scenarios are modified slightly due to the addition of energy recovery turbine 140 with nozzle valve 152C. When the pressure of the first reverse osmosis chamber 120 is desired to be increased while pressure in the second reverse osmosis chamber 130 is desired to remain constant, the nozzle valve 152A is closed, nozzle valve 152C is opened, and valve 152B is closed. When the pressure of the first reverse osmosis chamber 120 is desired to be lowered and the pressure of the second reverse osmosis chamber 130 is desired to remain constant, the nozzle valve 152A is opened, the nozzle valve 152C is closed and the nozzle valve 152B is opened. When the pressure of the first reverse osmosis chamber 120 is desired to remain constant while increasing the pressure of the second reverse osmosis chamber 130, the nozzle valve 152C is closed and the nozzle valve 152B is opened. When the pressure in the first reverse osmosis chamber 120 is desired to remain constant while decreasing the second reverse osmosis chamber 130, the nozzle valve 152C is opened while the nozzle valve 152B is closed.

In addition to the embodiments above an additional energy recovery turbine 160 may be positioned after feed pump 112 and process chamber 120 to receive a portion of the high pressure fluid from the first process chamber 120 and/or the second process chamber 130. This embodiment allows controlled recovery of more energy in the system.

As is described, the present invention provides independent control of flow and pressure in each reverse osmosis chamber while providing maximum energy recovery by eliminating throttling of any fluid stream. Although two reverse osmosis chambers have been illustrated, the present invention may be applied to processes using various numbers of reverse osmosis chambers.

Those skilled in the art will recognize that the adjustment of the nozzle valves in response to system parameters may be controlled in an automated fashion, such as computer controlled drive to the complexity of such a system.

While particular embodiments of the invention have been shown and described, numerous variations and alternate embodiments will occur to those skilled in the art. Accordingly, it is intended that the invention be limited only in terms of the appended claims.

What is claimed is:

1. A reverse osmosis system comprising:
   a first process chamber having a first reverse osmosis membrane therein, said first process chamber having a first feed inlet, a first permeate outlet and a first concentrate outlet;
   a second process chamber having a second reverse osmosis membrane therein, said second process chamber having a second feed inlet, a second permeate outlet and a second concentrate outlet;
   a common shaft having rotatably coupled thereto a first pump fluidically coupled to said first feed inlet, a pump motor, a first energy recovery turbine fluidically coupled to said first concentrate outlet and a second energy recovery turbine fluidically coupled to said second concentrate outlet; and,
   a second pump fluidically coupled to said first concentrate outlet and the second feed inlet.

2. A method as recited in claim 1 wherein said first energy recovery device comprises a first nozzle valve and said second energy recovery device comprises a second nozzle valve.

3. A reverse osmosis system as recited in claim 1 wherein said second pump is rotatably coupled to a booster pump motor.

4. A reverse osmosis system as recited in claim 1 wherein said second pump is rotatably coupled to a third energy recovery device fluidically coupled to said second concentrate outlet.

5. A method of operating the reverse osmosis system as recited in claim 1 comprising the steps of:
   providing energy from the first concentrate outlet of the first process chamber to drive the first energy recovery turbine to reduce an amount of energy required by the pump motor of the first pump to boost a pressure of feed fluid to a first process chamber; and,
   providing energy from the second concentrate outlet of the second process chamber to drive the second energy recovery turbine to reduce the amount of energy required by the pump motor of the first pump to boost the pressure of feed fluid to the first process chamber.

6. A method as recited in claim 5 further comprising the steps of providing a motor coupled to said second pump; boosting a second process chamber inlet pressure with the motor and said second pump.

7. A method as recited in claim 5 further comprising the steps of providing a third energy recovery turbine; and boosting a second process chamber inlet pressure with the third energy recovery turbine.

8. A method as recited in claim 7 further comprising the step coupling the third energy recovery turbine to a second concentrate outlet.

9. A method as recited in claim 5 further comprising the step of providing energy from a first reverse osmosis chamber comprises the steps of closing a first nozzle valve and reducing a speed of a first booster pump.

10. A method as recited in claim 5 further comprising the steps of lowering a first pressure of the first process chamber and maintaining a second pressure of the second process chamber by opening a first nozzle valve and increasing a booster pump speed.

11. A method as recited in claim 5 further comprising the step of maintaining a first pressure of the first process chamber and increasing the second pressure of a second process chamber by increasing a speed of a booster pump and closing a second nozzle valve.

12. A method as recited in claim 5 further comprising the step of maintaining the first pressure of a first process chamber and decreasing the pressure of the second process chamber by reducing the speed of a booster pump and opening a second nozzle valve.

13. A method as recited in claim 5 further comprising the step of increasing a first pressure of the first process chamber and maintaining the second pressure of a second process chamber by closing a first nozzle valve, closing a second nozzle valve and opening a third nozzle valve.

14. A method as recited in claim 13 further comprising the steps of decreasing the first pressure of the first process chamber and maintaining the second pressure of the second process chamber by opening the first nozzle valve, opening the second nozzle valve and closing the third nozzle valve.

15. A method as recited in claim 14 further comprising the steps of maintaining the first pressure of the first process chamber and increasing the second pressure of the second process chamber by opening the second nozzle valve and closing the third nozzle valve.

16. A method as recited in claim 14 further comprising the steps of maintaining the first pressure of a first process chamber and decreasing the second pre-sure of the second process chamber by closing the second nozzle valve and opening the third nozzle valve.

* * * * *